Aug. 24, 1965  H. E. A. BORZER  3,202,229
DEVICE FOR MEASURING AND PRINTING AN ANGULAR
OR LINEAR DISPLACEMENT
Filed Nov. 15, 1963  3 Sheets-Sheet 1

Inventor
Henri Edouard Alfred Borzer
By Alvin Browdy
Attorney

Aug. 24, 1965 H. E. A. BORZER 3,202,229
DEVICE FOR MEASURING AND PRINTING AN ANGULAR
OR LINEAR DISPLACEMENT
Filed Nov. 15, 1963 3 Sheets-Sheet 3

Inventor
Henri Edouard Alfred Borzer
By Alvin Browdy
Attorney

United States Patent Office 3,202,229
Patented Aug. 24, 1965

3,202,229
DEVICE FOR MEASURING AND PRINTING AN ANGULAR OR LINEAR DISPLACEMENT
Henri Edouard Alfred Borzer, Bethune, Pas-de-Calais, France, assignor to Manufacture de Bethune, Bethune, Pas-de-Calais, France, a company of France
Filed Nov. 15, 1963, Ser. No. 324,076
9 Claims. (Cl. 177—2)

Various solutions have been proposed up to date for measuring and printing an angular or linear displacement, and among these it has ben suggested to resort to position detectors using devices based on photoelectric readings and pulse counting. Such devices, usually delicate, have in addition the drawback of being sensitive—as are all the devices based on electric pulses—to the pulse losses, which results in introducing the likelihood of having the measures considerably altered.

The present invention overcomes such drawbacks in a new device adapted to measure and remote print an angular or linear displacement, such device being simple, sturdy, including no electric pulse counting elements, and allowing to print the results by means of printing mechanical counters.

The device according to this invention is based on the properties of the self-synchronizing electric motors also referred to as "selsyn motors," i.e. the remote transmission of a power torque and the angular displacement of two selsyn motors which are indicative of position in the absence of a resisting torque.

Moreover, owing to the particular arrangement of the device of this invention, there can be obtained a higher accuracy and a lower cost price over other devices.

According to the present invention, said device includes an electromechanical indicator unit comprising an element indicating an angular or linear displacement and driving a pin which determines the amount of such displacement, which may be blocked by an electric brake and adapted to be sought by a feeler or sensing member which is driven by an electric motor being a part of an electromechanical receiver unit rotated by said motor, by means of a flexible toothed wheel connected by a clutch to a pinion, which may be blocked by an electric brake, adapted to drive a printing counter, both said units being servoed to a control electric device provided to control, through a main switch, the voltage supplied to relays for energizing said motor and said brakes.

The above characteristics and advantages are in part obvious or will appear in part when reading the following detailed description in connection with the annexed drawings which show, in an illustrative and by no means limitative form, examples of embodiments according to this invention.

The embodiments hereunder described apply to the transmission, recording and reading of results of weighings effected by one or more automatic reversible weighing-machines, but it is obvious that other applications may be contemplated within the scope of this invention.

Figure 1:
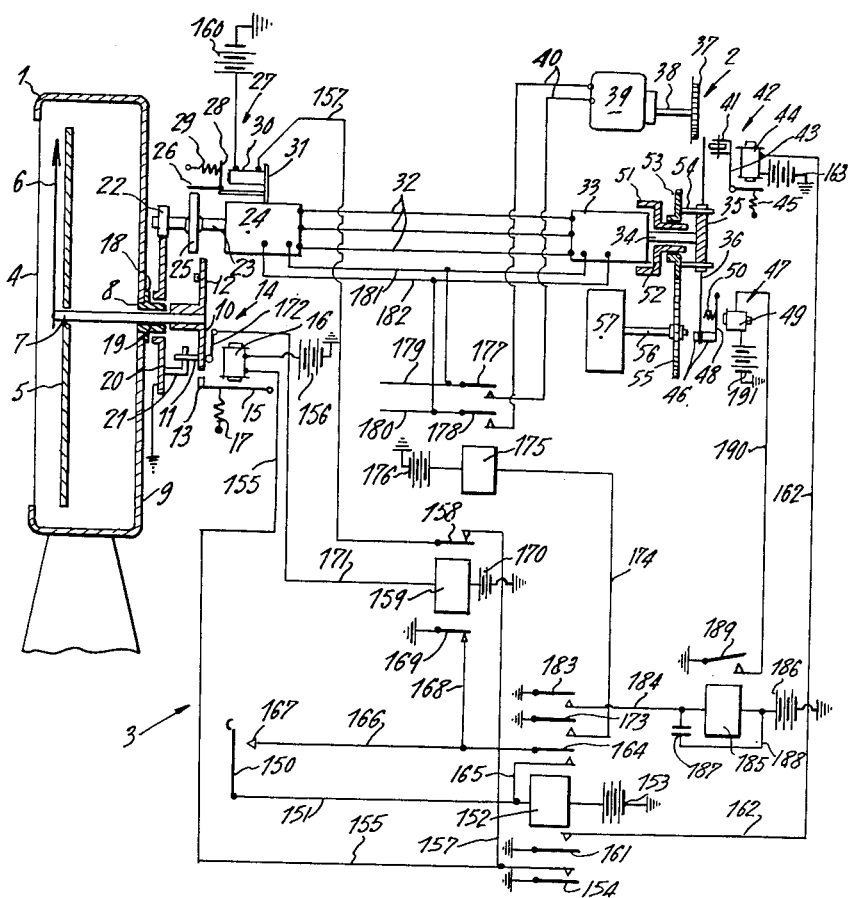
FIG. 1 is a schematic general lay-out, partly in section, of the device according to the invention.

According to the embodiment shown in FIG. 1, the device of this invention includes an electromechanical indicator unit 1, which is electrically connected to an electromechanical receiver unit 2, both of said units being electrically connected to a control electric device 3.

Electromechanical indicator unit 1 includes an indication member 4 of a weighing-machine, said member 4 being constituted by a dial 5 with which is registered a movable pointer 6 keyed at one end of a shaft 7 supported by a bearing 8 which is fixed to the casing 9 of said dial. The other end of shaft 7, which extends out of casing 9, supports a disk 10 provided, on the one hand, with a horizontal pin or dog 11 which extends in register with casing 9 and, on the other hand, with a mass 12 constituting a counterweight for pin 11. The peripheral portion of disk 10 runs in front of a shoe member 13, which belongs to an electric brake 14 and is supported by a pivoting armature 15 adapted to be attracted by a fixed coil 16 and counteracted by the action of a spring member 17 which tends always to hold said shoe member 13 in such a position that the latter is not engaged with the peripheral portion of disk 10.

Extending radially from bearing 8 is a collar or flange 18 having a supporting hub portion 19 over which is telescoped a toothed wheel 20 provided with a feeler or sensing member 21 projecting thereon and registering with disk 10 in order to cooperate with pin 11.

It is to be noted that in such embodiment of the invention a high centering precision is obtained owing to the concentric mounting of toothed wheel 20 and disk 10.

Toothed wheel 20 is in meshing relationship with a pinion 22 keyed to the output shaft 23 of a selsyn motor 24. In addition to pinion 22, shaft 23 supports also a disk 25 having a peripheral portion which may be engaged by the shoe member 26 of an electric brake 27 which supports a pivoting armature 28 biased by a spring element 29 to retain shoe member 26 against the peripheral portion or surface of disk 25. Said pivoting armature 28 is attractable under the magnetic action of a coil 30 attached to a bracket 31 fixed to the housing of selsyn motor 24.

Selsyn motor 24, which is a part of electromechanical indicator unit 1, is electrically connected by conductors 32 so as to cooperate with a second selsyn motor 33 which is a part of electromechanical receiver unit 2.

The output shaft 34 of selsyn motor 33 supports a disk 35 on which is keyed a flexible toothed wheel 36 rotatably driven by a driving pinion 37 which is fast to the shaft 38 of an electric motor 39 electrically connected to the power supply mains by conductors 40.

Said flexible toothed wheel 36 is adapted to be engaged with and disengaged from driving pinion 37 under the action of an abutment member 41 associated with an electromechanical clutch 42 supported by a pivoting armature 43 which is adapted to be attracted by a cooperating fixed magnetic coil 44. Said pivoting armature 43 is biased by a spring element 45 to hold abutment 41 in a position for which flexible toothed wheel 36 is out of engagement with pinion 37. Moreover, flexible tooothed wheel 36 runs between a pair of respectively movable and fixed fingers 46 associated with an electric brake 47, one of said fingers (the movable one) being supported by a pivoting armature 48 adapted to be attracted by a fixed magnetic coil 49. Pivoting armature 48 is biased by the force of a spring element 50 which tends to hold the finger 46 supported by this armature engaged in such a manner against the fixed one of said fingers 46 to prevent rotation of toothed wheel 36.

The housing of selsyn motor 33 supports a circular member 51 forming a bearing 52, which is coaxial with shaft 34 and on which is rotatably mounted a driving pinion 53 having a pair of horizontal opposed pins or fingers 54, which face disk 35 and are adapted to be engaged respectively in two kidney-shaped slots (not shown) in disk 35. Said driving pinion 53 cooperates, in a 1:1 gear ratio, with a pinion 55 keyed to a shaft 56 leading to a printing counter 57.

Although this is not represented, electromechanical receiver unit 2 may be provided with one or several reading elements, the movements of which are synchronized with those of the pointer 6 of indication element 4 of electromechanical indicator unit 1.

Said electromechanical indicator unit 1 and electromechanical receiver unit 2 above-described are electrically connected to control electric device 3 by means which are fully described below.

Such device is provided with an intermittent manually or automatically operated main switch 150 mounted in a conductor 151 of a main relay 152 which is energized by a power source 153.

Relay 152 is provided with a first movable working grounded contact 154 in a conductor 155 leading to coil 16 of brake 14, said coil being energized from a power source 156. Conductor 155 has, in addition, a branch conductor 157 which is connected to a movable rest contact 158 of a secondary relay 159 and to the coil 30 of brake 27 which is energized by a power source 160.

Main relay 152 is also provided with a second movable working contact 161, which is grounded and mounted in a conductor 162 which energizes coil 44 of clutch 42 connected to a power source 163.

In addition, relay 152 is provided with a third movable working contact 164 mounted between a branch conductor 165 of conductor 151 and a conductor 166 leading to a fixed contact 167 of main switch 150. This conductor 166 has also a branch conductor 168 to which is connected the second movable rest grounded contact 169 of a secondary relay 159, the energizing circuit of which comprises a power source 170 and a conductor 171 connected to a sliding contact 172 associated to disk 10, pin 11, sensing member 21 and toothed wheel 20 which is grounded.

In addition, main relay 152 is provided with a fourth movable working contact 173, which is grounded and is a part of a conductor 174 leading to another secondary relay 175 energized by a power source 176. Said secondary relay is provided with two movable working contacts 177 and 178, connected respectively to conductors 179 and 180 having a general energizing function and having two respective conductors 181 and 182 for exciting selsyn motors 24 and 33, respectively.

Main relay 152 includes also a fifth movable working contact 183, which is grounded and is associated with a conductor 184 leading from a third secondary relay 185 energized by a power source 186. Such relay 185 is delayed by a delaying condenser 187, which is energized by said source 186 and is series connected in a branch conductor 188 of conductor 184. A movable working grounded contact 189, which is associated with said third secondary delayed relay 185, is series connected in a conductor 190 leading to magnetic coil 49 of brake 47 which is energized by a power source 191.

The above-described device operates in the following manner:

When pointer 6 of the weighing machine has come to a stabilized position after a loading, it is easy to understand that horizontal pin or dog 11, having assumed a position defined on the imaginary circumference that it may describe, is also characteristic or representative of the value of the weighted load.

Switch 150 may then, manually or automatically, be triggered, to engage fixed contact 167. This results, on the one hand, in energizing main relay 152 by power source 153, the coil of the relay, conductor 151, switch 150, conductor 166, branch conductor 168 and grounded movable rest contact 169 of secondary relay 159, and on the other hand, in attracting the different working contacts of main relay 152.

Movable contact 154 closes energizing conductor 155 of brake 16, which results in pivoting armature 15 against the action of spring member 17, and in applying shoe member 13 onto disk 10, which is, consequently, blocked in the determined position resulting from the value of the weighed load. Movable contact 154 closes, in addition, the circuit of branch conductor 157, which energizes electric brake 27 thereby pivoting armature 28 against the action of spring member 29, and thus releasing disk 25 and shaft 23 of selsyn motor 24.

Movable contact 161 connects conductor 162 and energizes electromagnetic clutch 42, this resulting in pivoting armature 43 thereof, which supports abutment member 41, against the force of spring member 45. This causes abutment member 41 to move flexible toothed wheel 36 in engagement with driving pinion 37 of motor 39.

Movable contact 164 has for its function to complete a circuit for permanently holding-in main relay 152, since the circuit completed by main switch 150 is temporary. Energization of said main relay is then effected by a circuit comprising source 153, relay 152, branch conductor 165, movable contact 164, branch conductor 168 and the grounded movable rest contact 169 of secondary relay 159.

Movable contact 173 completes the energizing circuit for secondary relay 175 which connects, through movable contacts 177 and 178, motor 39 to the main power supply leads 179, 180 thereby energizing motors 24 and 33 through branch conductors 181 and 182 provided ahead of said movable contacts 177 and 178.

Movable contact 183 completes the circuit of secondary relay 185 which energizes, through movable contact 189 thereof, the conductor 190, thus resulting in energizing electric brake 47, of which the pivoting armature 48, being pivoted against the force of spring member 50, releases flexible toothed wheel 36 and thus selsyn motor 33.

As is easy to understand, motor 39, which is energized by contacts 177 and 178, rotates and drives, through pinion 37, the flexible toothed wheel 36, the rotation of which is transmitted by shaft 34 to selsyn motor 33.

The electric connection through conductors 32 insures the angular alignment of selsyn motor 24 with selsyn motor 33 and, consequently, the torque transmission of shaft 34 to shaft 23, the disk 25 of which is released by the return of shoe member 26 of electric brake 27. Through pinion 22, shaft 23 rotates toothed wheel 20, thus causing feeler or sensing member 21 to rotate to engage pin 11.

When feeler 21 engages pin 11, this results in completing the circuit of secondary relay 159 and energizing the same by power source 170, relay 159, conductor 171, sliding contact 172, pin 11, feeler 21 and toothed wheel 20 which is grounded. Said relay thus attracts movable rest contacts 158 and 169. Contact 158 opens the circuit energizing the brake 27, which results in returning the pivoting armature 28 by the action of spring member 29, and results also in blocking the disk 25 and the selsyn motor 24 in a position determined by shoe 26. Movable contact 169 opens the holding circuit, thus interrupting the electric power to main relay 152.

Movable contact 154 of relay 152 opens, which interrupts the electric power to brake 14, the pivoting armature of which, thus returned by spring member 17, releases disk 10. Also, movable contact 161 interrupts the electric power to electromagnetic clutch 42, which results in disengaging flexible toothed wheel 36 from driving gear 37. At the same moment, movable contact 173 opens the energizing circuit of secondary relay 175, the movable contacts 177 and 178 of which open, thus resulting in stopping electric motor 39.

Movable contact 183 opens also the circuit energizing delayed relay 185, but the latter remains energized during a definite period corresponding to the discharge time of condenser 187. Consequently, such opening of the circuit has no immediate effect on the electric supply to brake 47, since movable contact 189 remains closed on its associated fixed contact.

After the successive operations above-described, shaft 23 of selsyn motor 24 is blocked, while shaft 34 of selsyn motor 33 and flexible toothed wheel 36 driven thereby are still freed.

Such delay in this blocking effected by the brake 47 is advantageously provided so that, by the intermediary of the fingers or pins 54 of pinion 53 cooperating with the aforementioned kidney-shaped slots (not shown), the flexible toothed wheel 36 may oscillate without moving pinion 53 and the shaft of selsyn motor 33 may align itself with the shaft of selsyn motor 24 without any friction. This alignment is necessary since shaft 33 is of necessity out of alignment and also it rotates some after shaft 23 is stopped by shoe member 26.

When delayed relay 185 is no longer energized by condenser 187, movable contact 189 opens, and interrupts the electric power to electric brake 47, thus causing the pivoting armature 48 of the latter to block flexible toothed wheel 36 in an angular position wherein shaft 34 of selsyn motor 33 is in the same angular alignment as is shaft 23 of selsyn motor 24.

After the aforesaid blocking, a known device, associated with printing counter 57, causes the pinion 55 and thus the driving gear 53, to rotate partially so as to cause fingers 54 to engage one of the transverse edges of each of the aforementioned kidney-shaped slots, and thus printing counter 57 is aligned with pointer 6 of the indication member 4 of the weighing machine, of electromechanical indicator unit 1, and said counter may then be actuated at this moment so as to make a print of the value of the weighed load.

Figure 2:
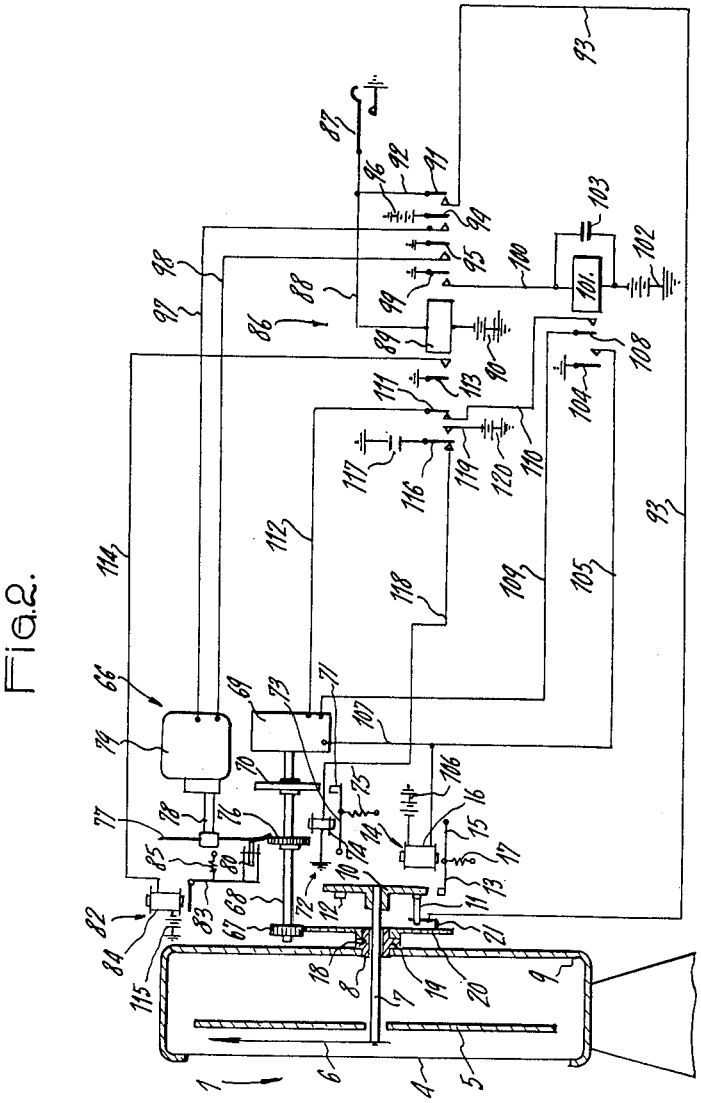
FIG. 2 is a schematic general lay-out, partly in section, of an alternative embodiment of the device according to the invention.
Figure 3:
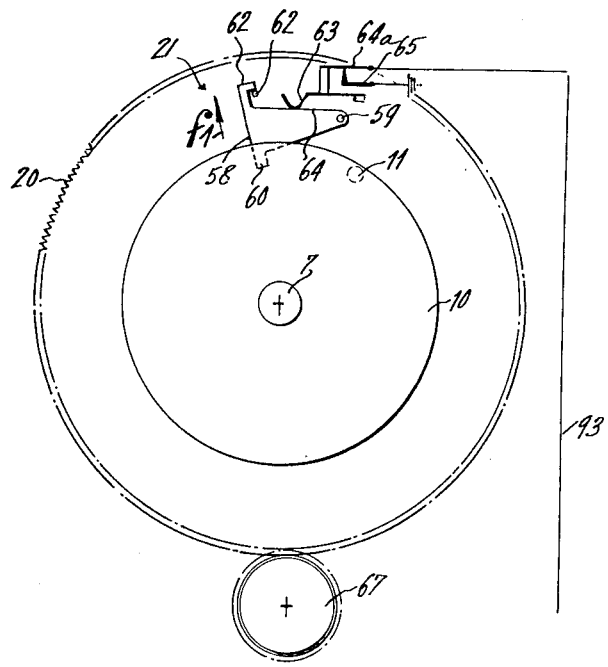
FIG. 3 is an enlarged side elevation showing a characteristic element of the device according to FIG. 2.

Another embodiment of the measuring and printing device according to this invention is shown in FIGS. 2 and 3, wherein said device is more particularly intended to be used in cases where the measurement and the printing of the displacement need not be remotely transmitted.

In an analogous manner, said device includes the electromechanical indicator unit 1 having the indication element 4 constituted by the dial 5, in front of which is displaced the pointer 6 mounted at one end of the shaft 7 supported by the bearing 8 fast to the casing 9. As in the first embodiment of this invention, the other end of shaft 7, which protrudes outwardly of casing 9, supports the disk 10 provided with the horizontal pin or dog 11 which extends opposite the casing, and the mass 12 constituting the counterweight for pin 11.

The peripheral surface of said disk 10 runs in front of the shoe member 13 of the electric brake 14 supported by the armature 15, which may be attracted by the magnetic coil 16 and is adapted to be under the action of the spring member 17 provided so as to always maintain shoe 13 in such a position that the latter is out of contact with the peripheral surface of disk 10.

In an identical manner, bearing 8 defines from collar 18 the hub portion 19 over which is rotatably telescoped the toothed wheel 20 which supports feeler 21.

As shown in FIG. 3, feeler 21 comprises a metallic element 58 having a T-shape form, which is pivotally mounted at the central leg thereof on a pin 59 supported on toothed wheel 20. Opposite to pin 59, said member 58 has, on one side of said central leg, a heel member 60 adapted to cooperate with pin 11 and on the other side a nose 61 which is maintained against a stop 62, which is supported by toothed wheel 20, by the action of a spring member 63 fast to wheel 20, and acts on a sloping cam surface 64 formed by the central leg of element 58. Said spring member 63 is, in addition, associated to a pivoting armature 64a adapted to cooperate with a fixed switching contact 65.

The toothed wheel 20, which is intended to drive an electromechanical receiver unit 66, meshes with a pinion 67 keyed on the end of a shaft 68 which rotates a printing counter 69. Said shaft 68 supports also a disk 70, on the peripheral surface of which may be applied the shoe 71 associated with an electric brake 72 and supported by a pivoting armature 73. Said armature, which can be biased by a fixed magnetic coil 74, is under the action of a spring member 75 always tending to maintain shoe 71 in such a position that the latter is out of engagement with the peripheral surface of disk 70.

In addition to pinion 67 and disk 70, the shaft 68 includes also a driving pinion 76 adapted to be rotated by a flexible toothed wheel 77 which is keyed to the shaft 78 of an electric motor 79. Said flexible toothed wheel 77 is adapted to be engaged with or disengaged from driving pinion 76 by means of a stop member 80 associated with an electromechanical clutch 82 and supported by a pivoting armature 83 capable of being biased under the action of a fixed magnetic coil 84. Said armature 83 is, in addition, under the action of a spring member 85 always tending to maintain stop 80 against toothed wheel 77 so that the latter is out of engagement with pinion 76.

The above-described electromechanical receiver unit 66 is electrically connected to a control electric device 86.

Device 86 includes a main switch 87, which is intermittently manually or automatically controlled, in the conductor 88 of a main relay 89 which is energized by a power source 90.

Said main relay 89 includes a first movable contact 91 mounted in a branching 92 and adapted to open or close for main relay 89 a holding circuit comprising a conductor 93 leading to the afore-mentioned pivoting armature 64a which cooperates with fixed contact 65 connected to the ground.

In addition, main relay 89 includes two movable switching contacts 94 and 95, of which contact 94 is connected to a power source 96 and is mounted in a conductor 97, while contact 95, which is grounded, is mounted in a conductor 98, said both conductors being provided to energize electric motor 79.

Main relay 89 includes also a fourth movable switching contact 99, which is grounded, and is mounted in a conductor 100 leading from a secondary relay 101, energized by a power source 102. Said secondary relay is delayed by a delaying condenser 103 connected in parallel therewith. Secondary relay 101 has a first movable switching contact 104, which is grounded and is mounted in a conductor 105 leading, on the one hand, to magnetic coil 16 of brake 14 which is energized by a power source 106 and, on the other hand, through a branch conductor 107, to printing counter 69. Secondary relay 101 includes, in addition, a second movable switching contact 108 in a conductor 109 leading from printing counter 69 and, in turn, connected by a conductor 110 to a movable rest contact 111, associated with main relay 89 and mounted in a conductor 112 leading also from printing counter 69.

Main relay 89 includes another movable switching contact 113 adapted to complete or open a conductor 114 connected to the fixed magnetic coil 84 of clutch 82, energized by a power source 115.

Main relay 89 includes, in addition, a sixth reversing contact 116 adapted to connect a grounded condenser 117 to a conductor 118 leading from the fixed magnetic coil 74 of brake 72 which is also grounded. Reference number 119 indicates a fixed contact energized by a power source 120 and with which may cooperate the reversing contact 116.

The above-described device operates in the following manner:

When pointer 6 of the weighing machine assumes a fixed position after weighing a load, it is an easy matter to understand that, since horizontal pin 11 has assumed a definite position on the imaginary circumference that it is able to describe, said pin characterizes also the value of the weighed load.

Then, main switch 87 is automatically or manually closed to temporarily energize main relay 89 through source 90 and, thus, to cause the different movable switching contacts thereof to be attracted.

Movable contact 91 then energizes through branch conductor 92, conductor 93, pivoting armature 64a and fixed contact 65 (see FIG. 3), the permanent holding circuit of main relay 89, so that the completion of the circuit is then assumed by main switch 87, the action of which is temporary.

Movable contact 99 insures the energization of conductor 100 and, thus, the energization of secondary relay 101 and of delaying condenser 103. This results in attracting movable contact 104 which completes the energizing circuit for magnetic coil 16, thus returning the pivoting armature 15 against the action of spring member 17 and applying shoe 13 onto disk 10 which is thus blocked in a determined position which is a function of the value of the weighed load. Energization of secondary relay 101 results also in attracting movable contact 108, thus energizing conductor 109 (leading from printing counter 69) by conductor 110, but the closing of said movable contact 108 has no effect upon printing counter 69, since movable rest contact 111 which is returned by main relay 89, opens conductors 110 and 112.

Energization of main relay 89 results also in attracting movable switching contacts 94 and 95, thus completing, through conductors 97 and 98, the energizing circuit of motor 79, which causes the latter to rotate.

Movable switching contact 116, which is attracted by relay 89, opens conductor 118, but since it moves to cooperate with fixed contact 119, said movable contact 116 energizes condenser 117 which then accumulates a charge.

Movable switching contact 113 connects conductor 114 to the ground, thus energizing the fixed magnetic coil 84 of clutch 82 and, in turn, causing the pivoting armature 83 to be returned against the action of spring member 85. The flexible toothed wheel 77 being so released from the pressure exerted by stop 80 resumes its initial position which results in meshing thereof with driving pinion 76.

As it is easy to understand, rotation of driving pinion 76 is transmitted by shaft 68 to printing counter 69 and pinion 67 which drives toothed wheel 20 and, in turn, feeler 21 so that the latter seeks pin 11.

When feeler 21 is moved into engagement with pin 11, the T-shaped member 58 swings on pivot pin 59 in the direction of arrow $f_1$ against the action of spring element 63, until the moment when such swinging results in moving the pivoting armature 64a to such an amount that the latter is no more engaged with the fixed contact 65. This results in opening the holding circuit and, in turn, in interrupting energization of main relay 89, thus releasing the different working and rest movable contacts.

Working movable contact 91 resumes its initial position interrupting the continuity of branching 92 and of conductor 93, and working movable contacts 94 and 95 open the energizing circuit for electric motor 79. Also, movable contact 113 interrupts energization of eletromechanical clutch 82, the armature 83 of which, returned by spring member 85, disengages flexible toothed wheel 77 from driving pinion 76. In an analogous manner, movable contact 116 disengages from fixed contact 119 and completes the circuit energizing the coil 74 of brake 72 which is thus temporarily excited by the discharge of condenser 117. This causes the return of armature 73 against the action of spring member 75, and applies shoe 71 on the peripheral surface of disk 70, thus blocking shaft 68, printing counter 69 and, through pinion 67, the toothed wheel 20 and the feeler 21.

It is to be noted that disengagement of armature 64a by the swinging member 58 is advantageously determined in order to stop instantaneously toothed wheel 20, so that heel 60 of member 58 is then spaced from pin 11 by a distance between 1 and 2 millimeters.

Movable contact 99 opens also the circuit of secondary relay 101, but the latter remains excited during a definite period corresponding to the discharge duration of condenser 103, and consequently it has no immediate effect on movable contacts 104 and 108. Thus, during the discharge period of condenser 103, movable contact 104 assumes the function of energizing the brake 14, thus maintaining the disk 10 blocked by shoe 13, while movable contact 108 connects conductor 109 and conductor 110 which is also connected, owing to the return of rest contact 111, to conductor 112 leading to printing counter 69. Closing of this circuit results in starting the printing cycle of the counter 69 and also in controlling, by a known device, rotation of pinion 67 and printing counter 69 to rotate toothed wheel 20 in the direction for which heel 60 engages pin 11, so that printing counter 69 is at this moment perfectly aligned on shaft 7, that is on the position of pointer 6 of the indicating element 4.

Said counter 69, as mentioned above, is maintained in a position defined by brake 14 during the whole period of printing, because during the printing cycle, counter 69 connects conductor 107 to ground, said ground connection replacing that of movable contact 104 after opening of secondary relay 101. At the end of the printing cycle, the connection of conductor 107 to ground, made by printing counter 69, is interrupted, the energizing circuit of brake 14 opens and pivoting armature 15 is returned under the action of spring member 17, thus releasing disk 10 and, in turn, leaving shaft 7 and pointer 6 free to rotate. On the other hand, printing counter 69 is reset to the initial position and the whole of the device and printing unit is again in its initial condition allowing these, after the next weighing, to be controlled by main switch 87 to print the value of this next weighing.

The examplary embodiment above-described relates to a device for measuring and printing an angular displacement, but it is obvious that the same device can be designed for measuring and printing a linear displacement.

Figure 4:
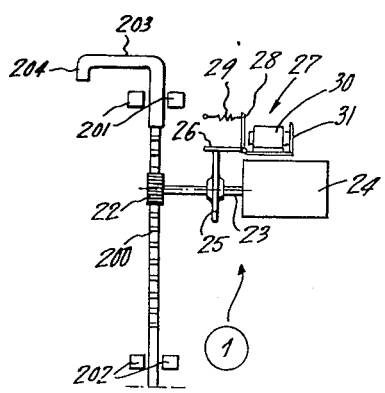
FIG. 4 is a fragmentary view representing another embodiment of the device according to this invention.

FIG. 4 shows an embodiment according to this invention for an application can be made to such a displacement.

According to FIG. 4, the electromechanical indicator unit 1 includes also the selsyn motor 24, having its output shaft 23 supporting the pinion 22 as well as the disk 25 which can be blocked by the shoe 26 of the brake 27, said shoe being integral with the pivoting armature 28 biased by the spring member 29. In an analogous manner, this pivoting armature may be attracted by the magnetic coil 30 supported by the rigid bracket 31 fixed to the housing of selsyn motor 24.

Pinion 22 is adapted to cooperate with a toothed rack 200, which is maintained and guided by slideways 201 and 202; one end of said rack comprises a nose member 203 having a feeler or sensing member 204 adapted, as is feeler 21, to seek the position of a pin (not shown) representative of the value of a linear displacement.

Thus, it may be noted that it suffices to replace the toothed wheel 20 by a toothed rack to obtain an embodiment suitable to linear displacements and that, consequently, the embodiment shown in FIG. 4 is only an alternative form of the embodiments shown in FIGS. 1 and 2.

It is to be understood that this invention is not limited to the embodiments described in detail and shown in the drawings, since different changes and modifications may be made by those skilled in the art within the scope of the invention as defined in the appended claims.

I claim:

1. A device for use with displacement measuring and printing apparatus comprising: an electromechanical indicator unit, said electromechanical indicator unit including a movable element indicating the displacement to be measured, a pin on said movable element, an electromechanical brake adapted to block the movement of said movable element at a predetermined time, a toothed element adjacent said movable element, said toothed element having a feeler for engaging said pin; an electromechanical receiver unit including an electric motor for driving said toothed element, said electric motor being connected to said toothed element through a flexible toothed member, said electric motor also being connected to said printing apparatus through said flexible toothed member, an electromechanical clutch for making and breaking the motor connection to said toothed element and said printing apparatus by cooperating with said flexible toothed wheel; and an electric control unit connected to said electric motor, said electromechanical indicator unit, and said electromechanical brake and clutch.

2. The device according to claim 1 wherein said electric control unit includes a main relay, a main switch to actuate said relay, and at least one secondary relay, whereby actuation of said main switch energizes said electric motor and said electromechanical brake and clutch.

3. The device according to claim 1 wherein said electromechanical indicator unit includes a dial associated with a weighing machine, a casing housing said dial, a shaft rotatably mounted in said casing, a pointer fixed to one end of said shaft adjacent said dial, the other end of said shaft protruding outwardly of said casing and having said movable element fixed thereon.

4. The device according to claim 1 wherein said electromechanical receiver unit includes a shaft connected to said printing apparatus, a gear on said shaft in meshing relationship with said flexible toothed wheel, a second gear on said shaft in meshing relationship with said toothed element, a rotatable member fixed to said shaft, and brake means associated with said rotatable member to block movement of said rotatable member and said shaft.

5. The device according to claim 4 wherein said electric control unit includes a main relay having a plurality of contacts, a main switch to actuate said relay, and a secondary relay, whereby actuation of said main switch energizes said electric motor and said electromechanical brake and clutch.

6. The device of claim 1 wherein said feeler on said toothed element comprises a metallic pivoting member, said pivoting member having a central leg, said central leg having at one end a heel to cooperate with said pin on said movable element and at the other end a nose maintained against a stop on said toothed element, a spring to bias said pivoting member, and means connecting said feeler to said electric control unit.

7. The device according to claim 1 wherein said toothed element having said feeler is driven by a gear on a shaft, a first selsyn motor driving said shaft, an electric brake for said shaft, a second selsyn motor synchronized with said first selsyn motor, a second shaft connected to said second selsyn motor, a driving pinion on said second shaft, and said flexible toothed member mounted on the end of said second shaft.

8. The device according to claim 7 wherein said shaft of said second selsyn motor has a bearing coaxial with the shaft, said driving pinion mounted on said bearing, means connecting said driving pinion and said flexible toothed member, said driving pinion also meshing with a gear connected to a shaft leading to said printing apparatus.

9. The device according to claim 1 wherein the toothed member is in the form of a rack whereby linear displacements may be measured.

References Cited by the Examiner

UNITED STATES PATENTS

| | | | |
|---|---|---|---|
| 2,664,260 | 12/53 | Saxe | 177—3 |
| 2,678,206 | 5/54 | Muldoon et al. | 177—5 |
| 2,812,172 | 11/57 | Whitecroft et al. | 177—2 |
| 2,919,123 | 12/59 | Spademan | 177—12 |
| 3,042,128 | 7/62 | Bell et al. | 177—210 |
| 3,044,563 | 7/62 | Gumpertz et al. | 177—3 |

LEYLAND M. MARTIN, *Primary Examiner.*